J. B. JOHNSON.
Machinery for Cementing Shoe Uppers and Soles.

No. 221,567. Patented Nov. 11, 1879.

Witnesses.
J. N. Piper
D. Tisdale

Inventor.
Joseph B. Johnson.
by attorney.
R. H. Eddy

N. PETERS, PHOTO-LITHOGRAPHER, WASHINGTON, D. C.

UNITED STATES PATENT OFFICE.

JOSEPH B. JOHNSON, OF LYNN, MASSACHUSETTS.

IMPROVEMENT IN MACHINERY FOR CEMENTING SHOE UPPERS AND SOLES.

Specification forming part of Letters Patent No. 221,567, dated November 11, 1879; application filed September 1, 1879.

*To all whom it may concern:*

Be it known that I, JOSEPH B. JOHNSON, of Lynn, of the county of Essex and State of Massachusetts, have invented a new and useful Improvement in Machinery for Aiding in Cementing together the Upper and the Sole or Soles of a Shoe; and I do hereby declare the same to be described in the following specification and represented in the accompanying drawings, of which—

Figure 1:
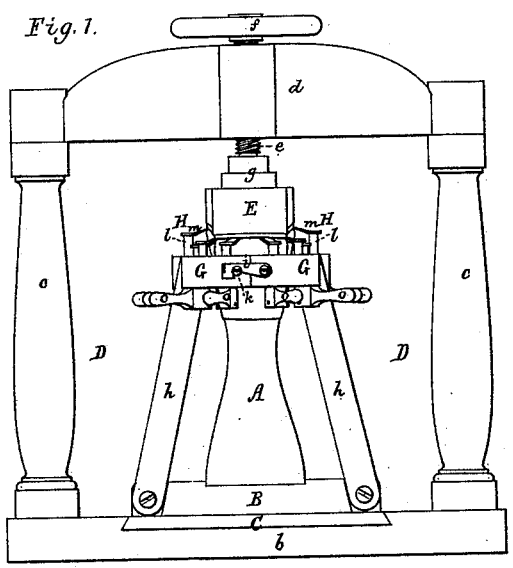
Figure 2:
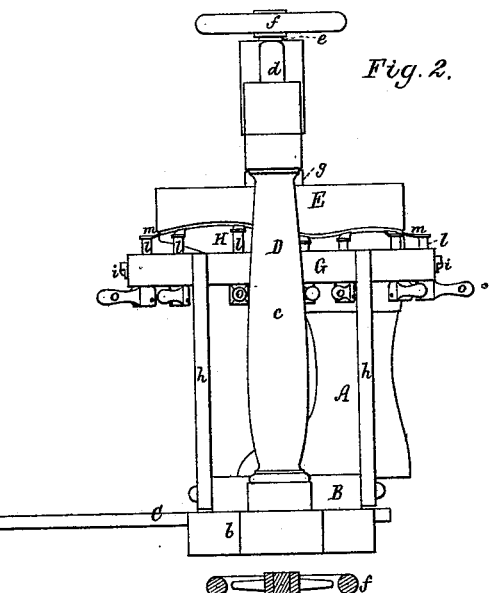
Figure 3:
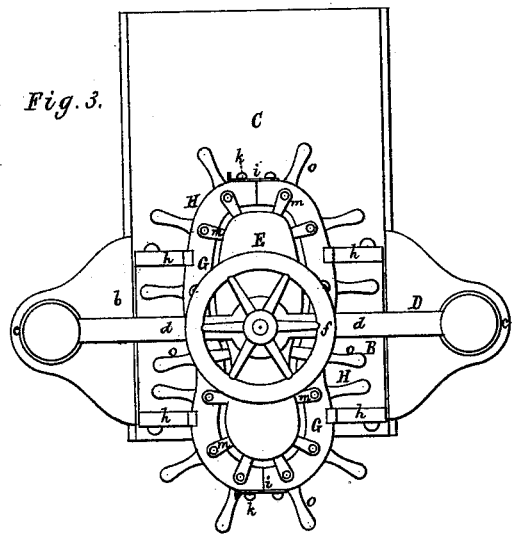
Figure 4:
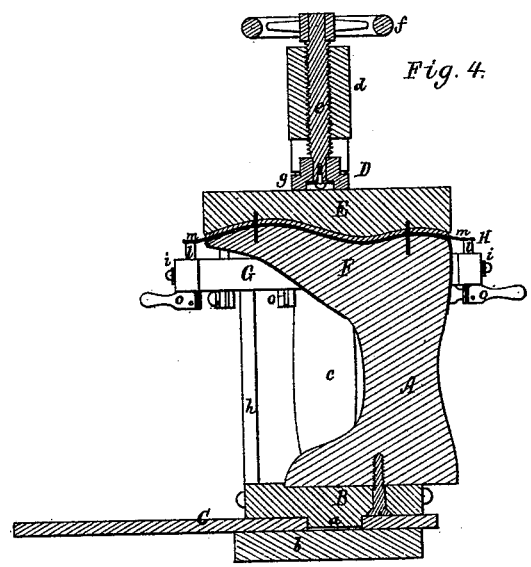
Figure 5:
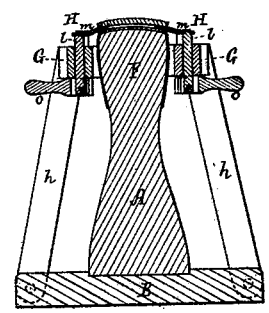

Figure 1 is a front elevation, Fig. 2 a side view, Fig. 3 a top view, and Fig. 4 a transverse section, of a machine containing my invention. Fig. 5 is a transverse section of the shoe-last and the clamping mechanism and its supports, to be hereinafter explained.

This machine is to enable a person to confine a shoe-upper to a last, or to it and an insole resting thereon, and to press down upon such upper, or upon it and the insole, an outer sole, in order to mold the latter to its proper shape and cause it to be fixed in place on the upper, or to it and the insole, by paste or cement previously applied to the surfaces to be cemented together. It will thus be seen that the machine is designed for use in making what is termed in trade "compo" shoes.

The machine is not for straining the upper in order to last it, as this is done by hand by an attendant with pinchers or other suitable means, certain parts of the machine holding the upper to the last or insole thereon as the lasting operation may progress and preparatory to the outer sole being forced down upon the upper with power sufficient to hold it in place. After such forcing down of the upper may have been accomplished the clamps for supporting the upper in its lasted state are to be withdrawn from it, and the mold by the press is to be forced down upon the sole with greater pressure, so as to effect the final molding of the sole and to hold it in position until the paste or cement may have become dry or sufficiently set.

The nature of my invention is duly set forth in the claims hereinafter presented.

In the drawings, A denotes a standard or last-supporter extending upward from a base, B, which, arranged on a slide or platform, C, is at its middle pivoted thereto, as shown at $a$, so as to be capable of being revolved horizontally thereon, the said platform C being adapted to the base $b$ of a press, D, so as to be capable of being slid backward and forward rectilinearly thereon or therein, in order to carry the last-supporter underneath the screw $e$ of the press, or out therefrom, as circumstances may require.

The press, as represented, is composed of the horizontal base $b$, two vertical columns or standards, $c$ $c$, an arch or cross-head, $d$, and a screw, $e$, all being arranged and applied substantially as shown.

The screw screws into the arch, and at its upper end such screw has fixed to it a hand-wheel, $f$. A head or bearer, $g$, turns on the foot of the screw and bears upon the mold E while the latter is being forced downward by the screw.

The last-supporter A carries a last, F, which may be in one piece with the supporter, or be separate therefrom and be suitably applied to it, so as to be held in place by and removable from it, as circumstances may require. This supporter may be like an ordinary jack, such as is used for sustaining a last.

Extending around the last, as shown, are two clamp-carriers, G G, each of which is supported by standards $h$ $h$, which, at their feet, are pivoted to the base B, so as to admit of the standards being moved apart from each other and the last, and subsequently moved toward and up to each other.

One of the carriers G has latches $i$ $i$ applied to it at its ends to operate with studs $k$ $k$, applied to the other carrier, the said latches and studs being to hold the carriers in connection, each of such carriers being furnished with a set of revoluble and vertically-movable clamps, H. Each of such clamps consists of a cylindrical shank, $l$, and a head or piece, $m$, the latter being in shape like a shoe-sole, and fixed to and projecting, as shown, from the said shank at its upper end.

Furthermore, each of the shanks is so adapted to the carriers as to be capable of being slid vertically and of being turned around horizontally therein; and there is jointed to each shank at its lower end a depressing or cam lever, $o$, which, by being turned against the under side of the carrier in a suitable way, will draw the shank and its head downward.

The carrier-supports may be pivoted directly to the base $b$ of the press or to the slide C; or, instead of having the latter, the base B may be arranged in and be pivoted to the said press-base $b$ as the base B is to the slide C; but I prefer to have the slide C and the base B arranged as shown, as they not only enable the last to be moved into and out of the press, but to be revolved, as occasion may require, to facilitate the lasting of a shoe.

The mold E is a block, usually made of metal, and counter-shaped in its lower surface to the sole of the last, so as to mold a shoe-sole to its proper form when on the last, or on an upper placed on such last.

The machine above described is to be used in the following manner—that is to say: An attendant having inserted the last and an insole, in an upper is to draw the latter closely to the last and lap it at its edges upon the insole in the usual way, and he is to move up to each other and latch together the clamp-carriers. Next he is to secure the lap by means of the clamps, each of which may be raised up and turned around more or less to fit it to properly extend over and rest on the lap. Having done this, the lap, in case the insole directly under it may not have had a quantity of liquid paste or cement applied to it, should be raised where projecting beyond the clamps and have paste or cement applied to its surface next to the insole. Next, the outer sole, having its lower surface covered with the liquid cement, should be laid on the insole and lap of the upper, the cemented surface being in contact with such lap. The mold should next be laid on the outer sole and the whole should be moved into the press, and the screw thereof should be revolved so as to force the mold downward upon the outer sole sufficiently to cause it to hold in place the lap of the upper. This having been accomplished, the clamps should be withdrawn from the lap by moving their carriers simultaneously away from each other, after which the press-screw is to be further revolved, so as to force the outer sole into close contact with the lap and insole and shape or mold the outer sole as may be required. As soon as the cement may have become sufficiently set the last with the shoe on it is to be removed from the press or machine.

My invention differs materially from what is described in the specification and shown in the drawings of the British Patent No. 379 of 1857. In the machine therein explained a slotted sheet of rubber is used with pressure-plates and a rotary cam-plate to effect the moving of the edges of a shoe-upper over upon an insole applied on a last, and, besides, such machine has nothing to perform the functions of the press of my machine, nor has it movable clamp-carriers and sets of clamps and clamping-levers, as in my machine, to operate with a last and a jack.

My invention also materially differs from the machine described in the United States Patent No. 136,317, wherein the devices for clamping and holding the upper to the insole are all attached to a single plate instead of to two separate carriers movable toward and away from each other, as in my machine. Therefore,

I claim as my invention as follows:

1. In a machine for molding a sole and aiding in the securing it to the upper and insole of a shoe, the combination of the movable clamp-carriers G and their sets of clamps H and clamping-levers $o$, substantially as described, with a jack or last-supporter, A.

2. The combination of the movable clamp-carriers G and their sets of clamps H and clamping-levers $o$, substantially as described, with a last, F, and its jack or supporter A, arranged as set forth.

3. The combination of the movable clamp-carriers G and their sets of clamps H and clamping-levers $o$, substantially as described, with the jack or last-supporter A and the press D, to operate therewith as explained.

4. The combination of the movable clamp-carriers G and their sets of clamps H and clamping-levers $o$, substantially as described, with the last F, its jack or supporter A, and a press, D, to operate therewith essentially as set forth.

5. The combination of the movable clamp-carriers G and their sets of clamps H and clamping-levers $o$, substantially as described, with a last-supporter, A, a last, F, a sole-mold, E, and a press, D, all arranged and to operate essentially as and for the purpose or objects as explained.

6. The combination of the movable carriers G and their series of clamps H and clamping-levers $o$, substantially as described, with the last-supporter A, a press, D, and a movable platform, C, to support such carriers, and adapted to slide within such press, as set forth.

7. The combination of the movable carriers G and their series of clamps H and clamping-levers $o$, substantially as described, and a rotary bed, B, for supporting such carriers, with a last-supporter, A, and a press, D, arranged to operate as set forth.

8. The combination of the rotary bed B and its supporting-slide C with the press D, the last-supporter A, and the movable carriers G and their series of clamps H and clamping-levers $o$, all being substantially as described.

9. The combination of the rotary bed B and its supporting-slide C, the press D, the movable carriers G, their clamps H, and clamping-levers $o$, the last-supporter A, a last, F, and a sole-mold, E, all adapted and arranged substantially and to operate as and for the purpose or objects set forth.

10. The combination of the series of revoluble and vertically-movable clamps and their clamping-levers and carriers with a last jack or supporter, all being adapted to operate substantially as shown and explained.

JOSEPH B. JOHNSON.

Witnesses:
R. H. EDDY,
W. W. LUNT.